UNITED STATES PATENT OFFICE.

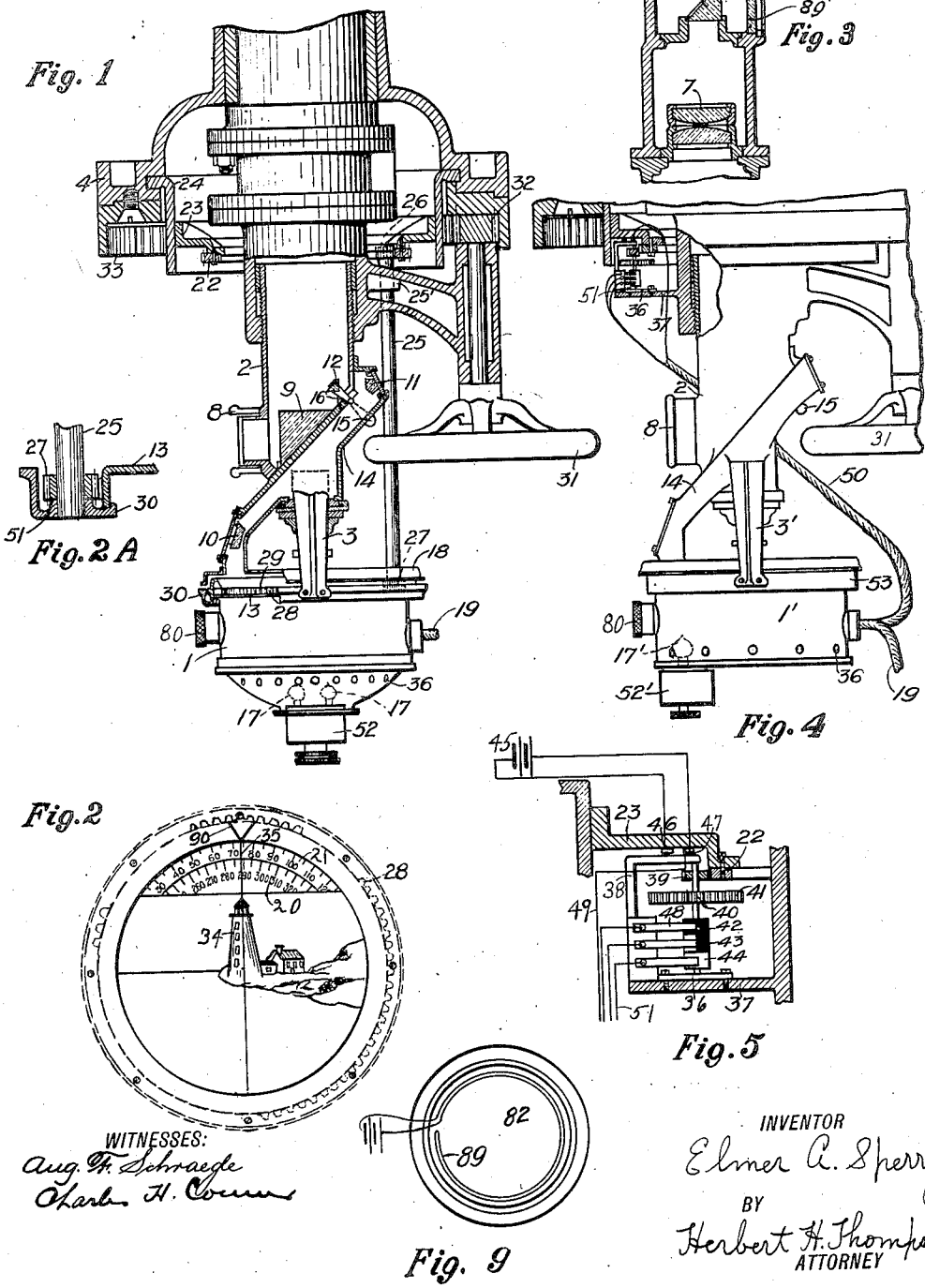

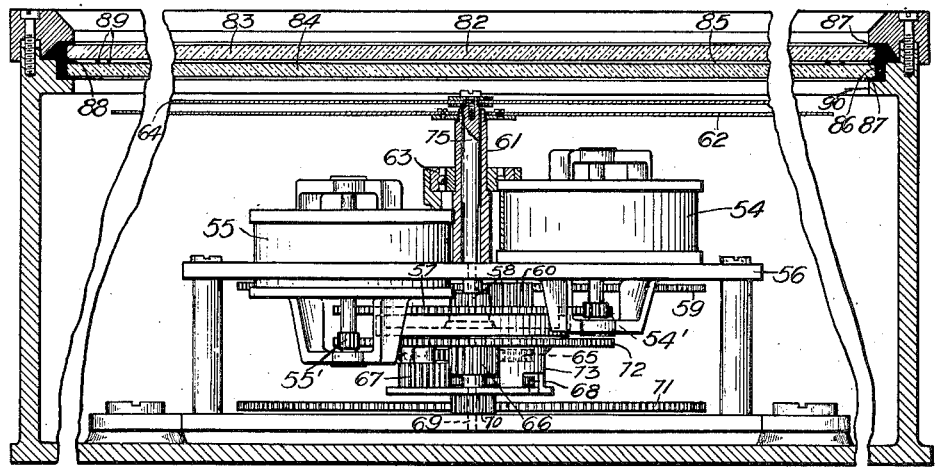
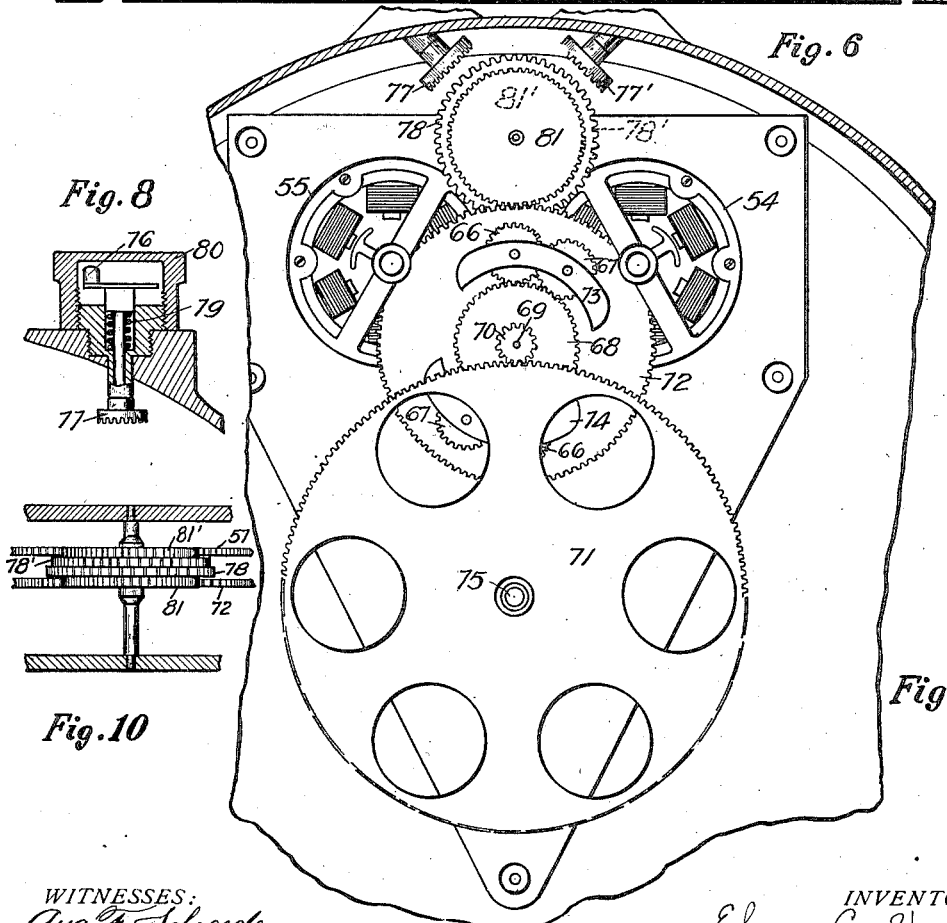

ELMER A. SPERRY, OF BROOKLYN, NEW YORK, ASSIGNOR TO THE SPERRY GYROSCOPE COMPANY, OF BROOKLYN, NEW YORK, A CORPORATION OF NEW YORK.

PERISCOPE AZIMUTH-INDICATOR.

1,203,151.   Specification of Letters Patent.   Patented Oct. 31, 1916.

Application filed May 21, 1914. Serial No. 839,952.

*To all whom it may concern:*

Be it known that I, ELMER A. SPERRY, a citizen of the United States, residing at Brooklyn, in the county of Kings and State of New York, have invented certain new and useful Improvements in Periscope Azimuth-Indicators, of which the following is a specification.

This invention relates to sighting instruments employed on ships to determine the bearings of distant objects, both with respect to the ship's course and the meridian. Such instruments assume the form of both rotatably mounted telescopes and periscopes, the latter being employed chiefly on submarines.

One object of the invention is to improve the construction of these instruments by mounting the indicating dials so as to be visible through the eye-piece of the instrument.

Another object is to so construct the dials that they may be mounted directly on the instrument, so that a separate base is not required and so that adjustments of the instrument will not throw the dials out of the range of vision.

A third object is to improve the construction of the instruments so that frosting of the glass parts is prevented.

Other objects will appear as the description proceeds.

Referring to the drawings, in which several of the many forms which my invention may assume are illustrated: Figure 1 is a sectional view of the lower portion of a periscope which has been improved according to my invention. Fig. 2 is a representation of the view seen through the eye-piece of the periscope. Fig. 2ª is a detail. Fig. 3 is a section of the upper portion of a periscope, showing my improved form of lens. Fig. 4 is an elevation, partly in section, of a periscope improved by a modified form of my invention. Fig. 5 is an enlarged detailed section of the commutating means shown in Fig. 4. Fig. 6 is a section of the form of repeater compass shown in Fig. 4, showing the mechanism employed. Fig. 7 is a bottom plan view of the same mechanism. Fig. 8 is a detailed sectional view of a synchronizing handle. Fig. 9 is a diagrammatic view of the top of a compass, showing my novel device for preventing frosting of the glass. Fig. 10 is a detail.

Referring first to the modification shown in Figs. 1 and 2, reference numeral 1 indicates some form of meridian or azimuth indicator. The form which is best adapted to my purposes is a repeater compass of the type employed in conjunction with a master compass of the gyroscopic type. This repeater is mounted directly on the sighting instrument 2, which is shown as a periscope on the drawings, by being suspended from it by brackets 3. The main periscope 2 is shown as rotatably mounted in the frame 4. It is made up in a number of sections as shown in order to secure proper adjustment. Not being a part of this invention, a detailed description of these parts is not considered necessary. The objective is shown at 5 (Fig. 3). Light, on entering the objective, is reflected downwardly by prism 6, and passes through a chromatic lens 7, and is finally reflected into the eye-piece 8 by prism 9. An arrangement of light reflecting prisms is provided to throw the light from the scales on the compass into the eye-piece conjointly with the light from the objective. A series of prisms 10, 11, 12 are shown by means of which the light rays from the scales 20 and 21 are reflected into prism 9 and from thence into the eye-piece. Prisms 10 and 11 are supported on removable plates secured adjacent each end of a tubular member 14 on the end of the periscope. Prism 12 is pivotally mounted on the tube 14 so that it may be swung out of the range of vision by handle 15, if desired. The edge 16 of the slot in tube 14 may be utilized to furnish a stop to hold the prism 12 in the correct position. The scales 20 and 21 are made transparent, are powerfully illuminated from below by lamps 17, and are covered on top by plate 18. A dimmer may be provided for the lamps so that the brilliancy of the scale may be adjusted to correspond to various light conditions on the outside. The dimmer may be mounted on the base of the compass as shown at 52. The compass may also be provided with a fixed pointer 90. Electrical energy is transmitted to the repeater from a suitable source of supply and from the master compass by means of cord 19. One of the scales 20 and 21 is fixed on the casing, and hence becomes a lubber's scale, while the other is actuated by the master compass.

Any suitable form of gearing may be employed to hold the compass fixed with respect to the lubber's line of the ship. A train of planetary gearing is illustrated on the drawings. A gear 22 is secured to an annular casting 23, which in turn is secured to a ring 24 fixed upon the frame 4. Journaled upon an extension 25' of the frame of the periscope is a shaft 25. The lower end of this shaft is supported in a bearing 51 which is formed on an L shaped ring 30, hereinafter referred to. Adjacent the upper end of this shaft is secured a pinion 26, which meshes with the gear 22. Adjacent the lower end of shaft 25 is secured a pinion 27, which meshes with a gear 28 upon a ring 29, which is mounted upon and supports the compass.

It is apparent that as the shaft 25 revolves with the periscope it is rotated by the stationary gear 22 so as to prevent the compass from rotating upon its axis. In order to allow this relative motion between the periscope and the compass, the brackets 3 are secured to the L-shaped ring 30 upon the inwardly extending portion of which the ring 29 rests and is free to revolve, the weight of the compass being borne by the last named ring.

The periscope is rotated by means of a hand wheel 31, which carries a pinion 32. This pinion meshes in the stationary annular gear 33, mounted upon frame 4.

Fig. 2 shows the view that is obtained through the eye-piece of the telescope, a lighthouse 34 being shown as being directly on the crosshair 35. The compass may be provided with ventilating holes 36, if desired.

In Figs. 4 to 8, inclusive, a modified form of repeater compass 1' is shown, which is secured to the sighting instrument 2, so as to revolve therewith. The construction of the main periscope is substantially the same as shown in Fig. 1 except that shaft 25 is omitted and an electrical commutating means 36 is provided. This means is shown as mounted on an extension 37 from the periscope and comprises a frame 38 in which are revolubly mounted a pair of shafts carrying pinions 39 and 40 and gear 41. The pinion 39 is on the same shaft as gear 41 and meshes with the fixed gear 22. Pinion 40 meshes with the gear 41 and rotates the commutator 42. This commutator is shown as made in three sections. Half of the surface of each section is composed of insulating material 43, while the other half is made of conducting material 44. The sections of insulation and conducting material are progressively placed at 90° ahead on each section. Current is communicated to the device from any source of electrical energy 45 by means of conducting rings 46 mounted upon part 23, against which rings spring-pressed brushes 47 are adapted to bear. Current from one of the brushes is short circuited to the frame 38 and, passing through shafts 39, enters one or more of the brushes 48, depending upon which brush is then bearing upon the conducting portion of the commutator. The wire 49 from the source of power is carried directly down through the cable 50 to the compass. Wires 51 lead from the brushes 48 through the cable 50 to the compass. It will thus be seen that an electrical commutating means is provided which is actuated by the rotation of the periscope and which is adapted to transmit current to a step-by-step motor in the compass to hold the lubber's scale fixed with respect to the ship, and to hold the compass card on the true meridian when the force it transmits is added in some way to the force transmitted from the master compass. The cable 19 from the master compass may be directly connected to the repeater as shown, since the angle through which the periscope revolves need not be over 180°. In this form also a less number of lamps 17' and a smaller dimmer 52' may be used, since it is only necessary to illuminate the scale directly under the tube 14, as the case of the repeater is held fixed on the periscope. The brackets 3' are directly attached to a fixed part 53 of the repeater.

The repeater is necessarily of a different design from that usually employed, which is the kind used in the first modification described. I have shown in Figs. 6, 7 and 8 my preferred construction of mechanism. In these figures the top cover 18 is not shown, as it may be removed if it is desired to use the repeater for other purposes. Numerals 54 and 55 denote a pair of step-by-step motors adapted to be actuated by electrical means transmitted from the commutator 42 and from the master compass, (not shown), respectively. These motors are mounted on a platform 56, and carry pinions 54' and 55' on their shafts. Motor 54 drives the gear wheel 57 on which is secured pinion 58. This pinion drives the large gear 59 through an idler 60. The sleeve 61 is secured to gear 59 and carries the graduated disk 62, which hence becomes the lubber's scale. Sleeve 61 is shown as mounted in the bearing 63. It will thus be seen that means are provided whereby the lubber's scale is rotated directly by motor 54. The train of gearing is designed, of course, so that scale 62 is turned backward as fast as the periscope is turned forward. In order that the motions of motors 54 and 55 may be properly combined to actuate the compass card 64, I prefer to employ differential gearing, which is shown as being of the spur gear type. Secured to gear 57 is a smaller gear 65 which meshes with one pair 66 of two pairs of planetary gears. The other pair 67 is mounted somewhat lower and meshes with gears 66 and also with gear 68, which is loosely mounted on shaft 69. Gear 68 carries pinion 70, which drives the large gear wheel 71. The gears 66 and 67 are rotatably mounted on the face of a gear 72 by means of the extensions 73 and 74. Gear 72 is driven by pinion 55' on the shaft of motor 55. The gear wheel 71 is secured to shaft 75 which extends freely through sleeve 61 and carries the compass card 64.

It may here be noted that, even in the general type of apparatus shown in Figs. 4, 5 and 6, that is where the indicator is fixed so as to revolve with the periscope, other means may be employed connecting the periscope and the lubber's scale and compounded with the motion of the compass-repeater motor, than the electrical means shown in these figures.

In order that the two cards may be set properly, or synchronized with the controlling elements, in case they should for any reason fall out of step, synchronizing handles 76 are provided. These handles and the gears which they drive are omitted from Fig. 6 for the sake of clearness, but are shown in Figs. 7, 8 and 10. Each of these handles carries a crowned pinion (77 and 77'.) These pinions 77 and 77' are not in the same horizontal plane and are normally held out of mesh with the gear 78 and a corresponding gear 78', respectively, directly above gear 78, by springs 79. Removable caps 80 are provided to protect the handles. Gear 78 carries a gear 81 which meshes with gear 72, through which it drives card 64. The gear directly above gear 78, which is indicated by 78' (see Fig. 10), carries a gear 81' similar to gear 81, which meshes with gear 57, through which it drives card 62. When it is desired to set card 64, for instance the operator simply presses handle 76 in and rotates it until the card assumes the correct position.

It is evident that the repeater compass above described and illustrated in Figs. 6, 7 and 8 is capable of other uses than the one which is shown in Fig. 4, since with slight modifications it can be made use of in many different ways. For instance, it may be located at a distance from the sighting telescope and fixed in a predetermined position and thus become a plotting indicator. If this is done, it is apparent that the only change necessary is to transpose the electrical connections so that the master compass actuates motor 54, while the transmitter on the telescope actuates motor 55. Card 62 then becomes the compass card and card 64 the scale which indicates, in connection with pointer 90, the angle the telescope is making with the lubber's line of the ship or, in short, the lubber's scale.

It should be noted that in both forms of my invention the indicator is supported by the periscope, thereby securing the advantage that it remains in the correct position irrespective of the vertical adjustments of the periscope. In this form of telescope, as in others, the length is adjusted to obtain a clear image, which results in the raising and lowering of the eye-piece. Also the periscopes are usually made with adjustable eye-pieces so that observers may adjust them to the most suitable height. Both of these elements would seriously impair the usefulness of a scale which was fixed on the ship, but do not affect an instrument made according to my invention.

When repeaters are used as shown in Figs. 1 and 4, great trouble has been experienced in keeping the glass cover 82 free from mist or "frost," since the lamps and motors keep the inside of the repeater warm, while the cover is cooled by contact with the outside air. I avoid this difficulty by providing a plurality of panes of glass 83 and 84, which are spaced by a small insulating chamber 85. The panes are mounted in a rubber ring 86, which is provided with ridges 87 at its periphery and an intermediate ridge 88, which serves to space the panes 83 and 84. This arrangement, while complete in itself, may be supplemented by the use of a wire 89 coiled in the space 85, which is adapted to be heated electrically so that the pane 84 may be kept warm, or may be warmed up to evaporate any mist that may have formed on it. This device may be made use of in any sort of window where troublesome frosting occurs. For instance, I have shown a modified form of my device on the objective of the periscope in Fig. 3. In this form the glass is made with small holes near the inner surface, and a wire 89', corresponding to wire 89, is threaded or molded therein.

In accordance with the provisions of the patent statutes, I have herein described the principle of operation of my invention, together with the apparatus which I now consider to represent the best embodiment thereof, but I desire to have it understood that the apparatus shown is only illustrative and that the invention can be carried out by other means. Also, while it is designed to use the various features and elements in the combination and relations described, some of these may be altered and others omitted without interfering with the more general results outlined, and the invention extends to such use.

Having described my invention, what I claim and desire to secure by Letters Patent is:

1. Apparatus for taking bearings, comprising a rotatably supported sighting instrument, a lubber's scale rotatably supported by said sighting instrument and automatic means connecting said instrument and scale, whereby the scale always indicates the true lubber's line, said scale and sighting instrument being so arranged that the scale is visible when sighting through the instrument.

2. An attachment for observation instruments for taking bearings, comprising a repeater compass supported by such an instrument, a lubber's scale on said compass, and a transmission system connecting said compass and instrument and actuated by movement of the instrument, whereby rotation of the instrument will not affect the readings of the compass and scale.

3. An apparatus for taking observations from below deck, comprising a supporting frame, a periscope supported in a vertical position by said frame and two scales supported by said periscope and mounted so as to be simultaneously visible through the eye-piece of the periscope, and automatic means connecting said periscope and scales, whereby one of said scales is held on the true lubber's line and the other of said scales fixed in azimuth.

4. An apparatus for taking bearings from a submarine, comprising a vertical bearing, a periscope rotatably mounted in said bearing, said periscope having a horizontally disposed eye-piece adjacent its lower end and a reflecting prism whereby the light coming down the periscope is reflected into the eye-piece, an azimuth indicator provided with a lubber's scale rotatably supported by said periscope, and a secondary prism located in said periscope whereby light from a predetermined portion of the indicator is reflected into the eye-piece of the periscope.

5. In periscopic apparatus, an instrument adapted to be attached to the periscope so as to revolve therewith, comprising a lubber's scale, automatic means connecting said scale and the periscope whereby said scale maintains a fixed relation to the lubber's line of the ship, a repeater compass card, and means to hold said card in fixed relation to the meridian comprising a repeater motor actuated from the master compass and compensating connections between said motor and said first mentioned means.

6. An apparatus for taking bearings, the combination with a rotatably supported sighting instrument, of a repeater compass fixed to said instrument, comprising a repeater motor adapted to be actuated from a master compass, a compass card, differential gearing connecting said motor and said card, and means actuated by the rotation of said sighting instrument also connected to said differential gearing, whereby the card is held in fixed relation to the meridian.

7. An apparatus for taking bearings comprising a rotatably supported sighting instrument, a lubber's scale rotatably supported by said sighting instrument, an electrical commutating means actuated by the rotation of said sighting instrument, an actuating motor connected to said lubber's scale, said motor being controlled by said commutating means, whereby the scale always indicates the true lubber's line.

8. An apparatus for taking bearings, comprising a rotatably supported sighting instrument, a lubber's scale rotatably supported by said sighting instrument, an electrical commutating means actuated by the rotation of said sighting instrument, an actuating motor connected to said lubber's scale, said motor being controlled by said actuating means, whereby the scale always indicates the true lubber's line, said scale and sighting instrument being so arranged that the scale is visible through the eye-piece of the instrument.

9. An apparatus for taking bearings, comprising a rotatably supported sighting instrument, an electrical commutating means actuated by the rotation of said instrument, a repeater compass fixed to said instrument, a pair of actuating motors connected to said compass, one of said motors being controlled by said commutating means and the other of said motors being actuated by the movements of the master compass, and differential gearing mounted between said motors and the repeater card, whereby the card is held in fixed relation to the true meridian.

10. A sighting instrument comprising a rotatably supported telescope, an electrical commutating means actuated by the rotation of said telescope, a plurality of indicating cards and a plurality of step-by-step motors, one of said motors being actuated through said commutating means and being geared to one of said cards directly, another of said motors being actuated by the master compass, and differential gearing mounted between said motors and another of said cards, whereby one of said cards indicates the position of the instrument with respect to the ship, while another shows the position of the instrument in azimuth.

11. A nautical instrument for the determination of the true and apparent bearings of a distant object and adapted to be used in conjunction with a master repeating compass, comprising a rotatably supported sighting telescope, an electrical commutating means actuated by the rotation of said telescope, and a plurality of indicating cards, one of said cards being controlled directly by said commutating means and another of said cards being controlled conjointly by said commutating means and said master compass, whereby the bearings of the object observed are shown both with respect to the meridian and to the lubber's line of the ship.

12. A nautical instrument for the determination of the true and apparent bearings of a distant object and adapted to be used in conjunction with a master repeating compass, comprising a rotatably supported sighting telescope, an electrical commutating means actuated by the rotation of said telescope, and a plurality of indicating cards, one of said cards being controlled directly by said commutating means and another of said cards being controlled conjointly by said commutating means and said master compass, both of said cards being arranged so as to be visible when sighting through the telescope, whereby the bearings of the object observed are shown with respect to the meridian and to the lubber's line of the ship.

13. A sighting instrument comprising a rotatably supported telescope, an electrical commutating means actuated by the rotation of said telescope, a plurality of indicating cards and a plurality of step-by-step motors, one of said motors being actuated through said commutating means and being geared to one of said cards directly, another of said motors being actuated by the master compass, and differential gearing mounted between said motors and another of said cards, both of said cards being arranged so as to be visible when sighting through the telescope, whereby one of said cards indicates the position of the instrument with respect to the ship, while another shows the position of the instrument in azimuth.

14. An instrument adapted to be used in conjunction with sighting instruments, comprising a compass card and a lubber's scale, a differential gear train, a motor directly connected to said lubber's scale and also connected to one arm of said differential gear train, a second motor connected to another arm of said train, the third arm of said train being connected to said compass card.

15. An instrument adapted to be used in conjunction with sighting instruments, comprising a plurality of revoluble indicating means, a differential gear train, a transmitter motor directly connected to one of said indicating means and also connected to one arm of said train, a second transmitter motor connected to another arm of said train, the third arm of said train being connected to another of said indicating means.

16. An apparatus for taking bearings, comprising a rotatably supported sighting instrument, a lubber's scale rotatably supported by said sighting instrument, an electrical commutating means actuated by the rotation of said sighting instrument, an actuating motor connected to said lubber's scale, said motor being controlled by said commutating means, whereby the scale always indicates the true angle which the sighting instrument makes with the lubber's line of the ship.

17. An apparatus for taking bearings, comprising a rotatably supported sighting instrument, an electrical commutating means actuated by the rotation of said instrument, a repeater compass fixed to said instrument, a pair of actuating motors connected to said compass, one of said motors being controlled by said commutating means and the other of said motors being actuated by the movements of the master compass, and means interconnecting said motors and the compass card whereby their motions are combined to hold the card in fixed relation to the meridian.

18. A repeater compass and indicator comprising a compass card and a lubber's scale, a differential gear train, a motor directly connected to said lubber's scale and also connected to one arm of said differential gear train, a second motor connected to another arm of said train, the third arm of said train being connected to said compass card, and a hand synchronizing means adapted to set each of the indicating means independently of the action of the motors.

In testimony whereof I affix my signature in presence of two witnesses.

ELMER A. SPERRY.

Witnesses:
CHARLES H. CONNER,
ALBERT W. STRINGHAM.